Figure 5:
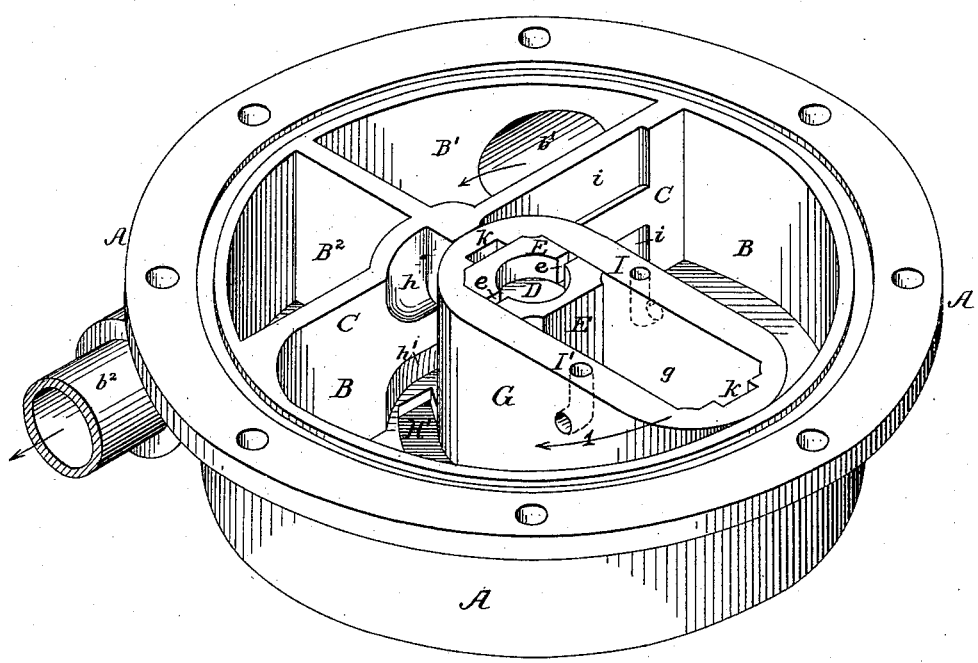

(No Model.) 3 Sheets—Sheet 1.
F. WALKER.
WATER METER.
No. 302,179. Patented July 15, 1884.
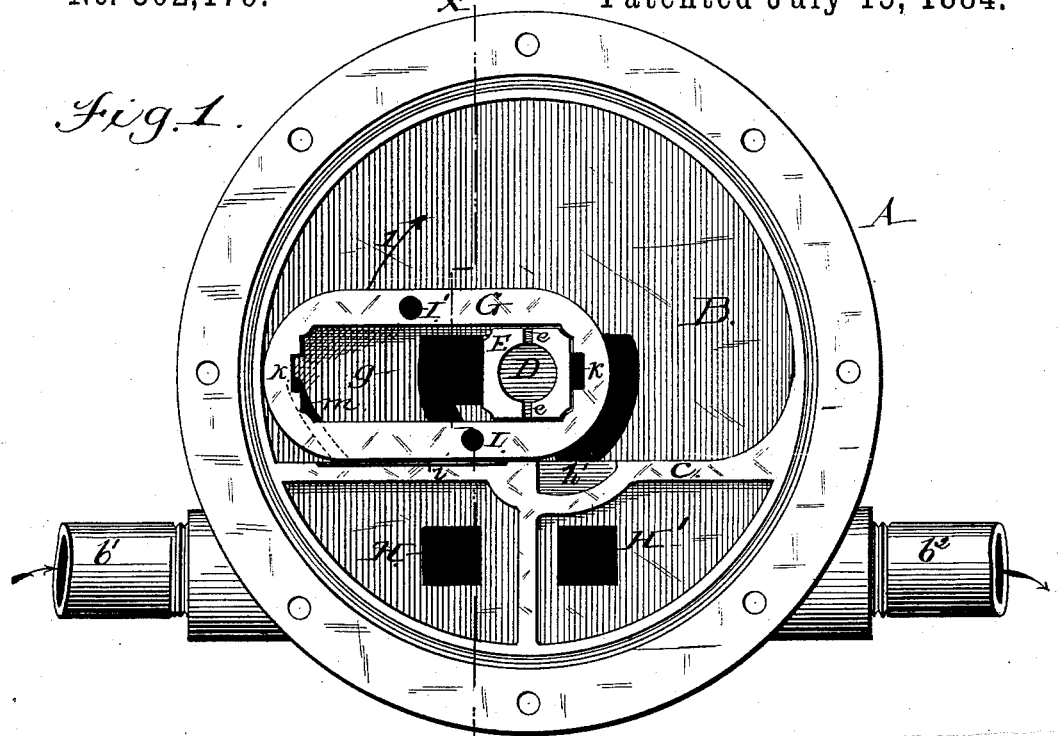
Fig.1.
Fig.3.
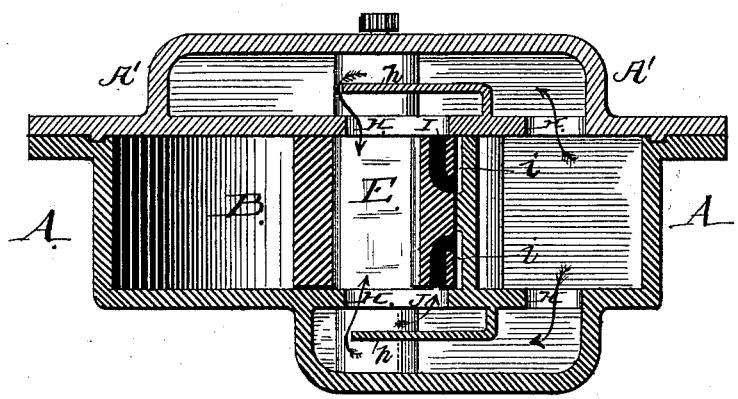
Witnesses:
Walter Fowler
H. B. Applewhaite
Inventor;
Frank Walker
per Attys.
A. H. Evans & Co.

(No Model.) 3 Sheets—Sheet 2.
F. WALKER.
WATER METER.
No. 302,179. Patented July 15, 1884.
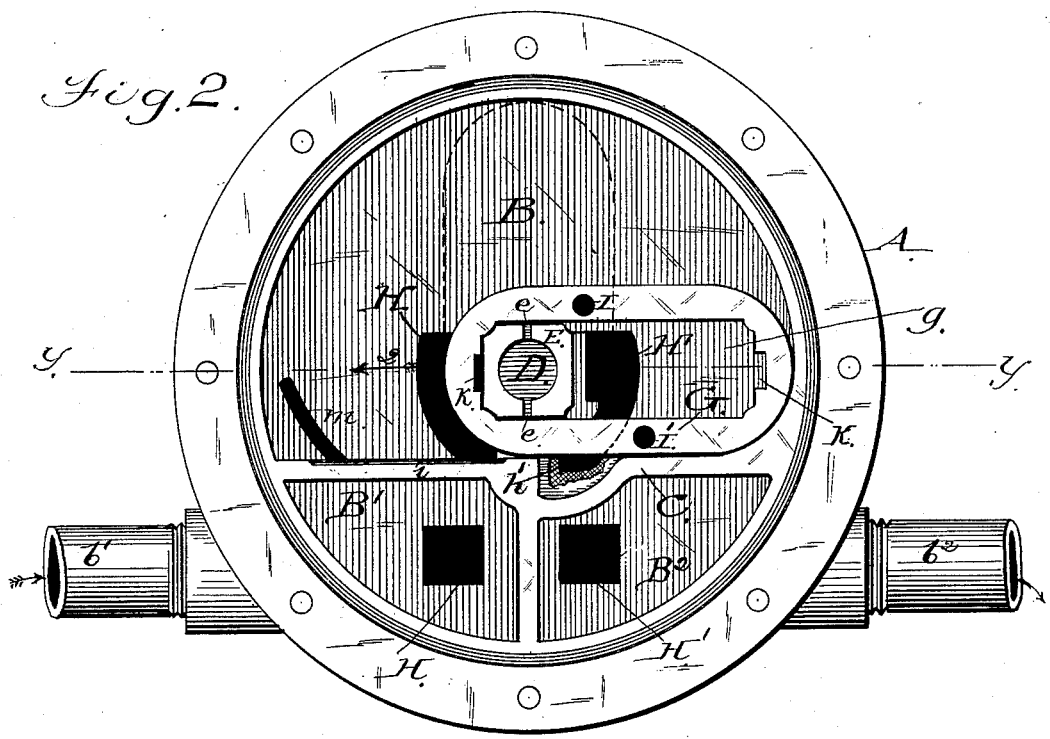
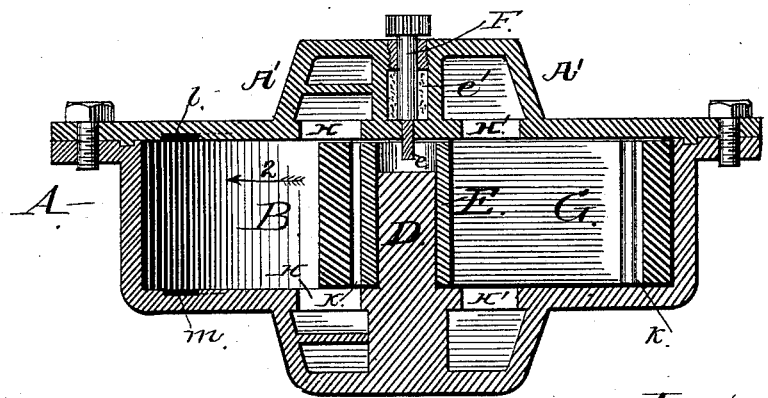
Witnesses:
Walter Fowler
H. B. Applewhaite
Inventor;
Frank Walker
per attys.
A. W. Evans & Co.

(No Model.) 3 Sheets—Sheet 3.

F. WALKER.
WATER METER.

No. 302,179. Patented July 15, 1884.

Witnesses:
John M. Clayton.
James F. Tobin

Inventor:
Frank Walker
by his Attys.
Howson and Sons

UNITED STATES PATENT OFFICE.

FRANK WALKER, OF TOMBSTONE, ARIZONA TERRITORY, ASSIGNOR TO THE KEYSTONE WATER METER MANUFACTURING COMPANY, (LIMITED,) OF PHILADELPHIA, PENNSYLVANIA.

WATER-METER.

SPECIFICATION forming part of Letters Patent No. 302,179, dated July 15, 1884.

Application filed November 22, 1883. (No model.)

*To all whom it may concern:*

Be it known that I, FRANK WALKER, of Tombstone, Cochise county, Arizona Territory, have invented certain new and useful Improvements in Water-Meters, of which the following is a specification.

My invention consists of improvements, fully described and claimed hereinafter, in the construction of meters for the measurement of water and other liquids, the objects of the said improvements being the lessening of the friction of the moving parts of the meter, and rendering its action positive and accurate.

In the accompanying drawings, Figure 1 is a plan view of the meter with the cap-plate removed. Fig. 2 is a similar view showing the piston in a position differing from that seen in Fig. 1. Fig. 3 is a transverse section on the line $xx$, Fig. 1; Fig. 4, a transverse section on the line $yy$, Fig. 2; and Fig. 5, a perspective view of the meter with the cap-plate removed, as in Figs. 1 and 2.

The body A of the meter is of the cylindrical form shown in the drawings, and is provided with a flange around its upper edge, to which is bolted the cap-plate A'. The interior of the cylinder is divided into the three chambers B, B', and B², of which the first, B, is the main working-chamber, separated from the inlet-chamber B' and the outlet-chamber B² by a transverse partition, C. With the inlet-chamber B' communicates a suitable supply-pipe, $b'$, the outlet-chamber having a discharge-pipe, $b^2$. The inlet-chamber B' communicates with the main chamber B through passages or ports H H, Figs. 1 and 3, in both the bottom plate and cover A', the main chamber B being in communication with the outlet-chamber B² through similar passages or ports, H' H', in the bottom plate and cover, Figs. 1, 4, and 5. I prefer to arrange in the passages H H deflectors $h$, Fig. 3, to render the flow of the water more steady. On the main chamber side of the partition C are formed adjacent to the entrance-ports H H recesses $i\,i$ (shown in Figs. 1 and 3, but more clearly in Fig. 5,) and adjacent to the outlet-ports are somewhat larger recesses $h'\,h'$, into which the outlet-ports extend, as shown in Fig. 5, for a purpose explained hereinafter. In the center of the cylinder is a fixed post or pin, D, on which a squared hub, E, is free to turn, and on this hub is fitted the piston G, having a central elongated rectangular slot, $g$, and rounded outer ends, so that while the piston will make a half-revolution with the hub in the direction of the arrow, Fig. 1, and as indicated in Fig. 5, it is free to slide longitudinally on the hub from the position shown in Fig. 2 to that shown in Fig. 1. The upper end of the hub E is slotted at $e$, Figs. 4 and 5, for the reception of the coupling on the lower end of the shaft F, which passes through a stuffing-box in the cover A', and is geared to the usual registering mechanism. At each end of the slot $g$ is formed in the piston a recess, K, which, when that end of the piston is in contact with the hub, forms a small chamber open at top and bottom to receive the incoming water through the ports H, Figs. 2 and 4, when the piston reaches the position shown in Fig. 2. In each side wall of the piston are formed ports I J I' J', Figs. 3 and 5, which, when the piston reaches the position shown in Fig. 1, form communication between the inlet-ports H H and the recesses $i\,i$ in the face of the partition C. Supposing the piston to be in the position shown in Fig. 1, the water entering through the ports H H will have filled the interior of the slot $g$ in the piston, and will pass through the ports I J to the recesses $i\,i$ behind the piston, and exert its pressure to turn the latter in the direction of the arrow 1, Figs. 1 and 5, the water in advance of the piston being meanwhile discharged through the outlets H' H'. When the piston has reached the position shown in Fig. 2, the incoming water will enter through the ports H H to the recess K between the piston and the hub E, and as the slot on the other side of the hub is open to the discharge-ports H' H' the pressure of water will force the piston diametrically across the chamber on the hub E from the position shown in Fig. 2 to that shown in Fig. 1, when the first-described movement of the piston will be repeated. It will thus be seen that a partial rotation of the piston alternates with a positive diametrical movement of the same, and the result of this will be the intermittent rotation of the hub E, which is communicated to the registering devices.

As the piston G is nearly balanced in all positions, and during its semicircular movement the hub E prevents the piston from binding against the circular wall of the chamber B, there is comparatively little friction, and the meter will work accurately under a very light pressure.

The recesses $h'$ in the partition C at the outlet-ports are to allow the water in advance of the piston to escape more readily, and permit the piston to complete its half-revolution and come up flush with the partition C prior to its diametrical movement.

In large meters I prefer to make in the inner faces of the cover A' and the bottom plate diagonal ports $l\ m$, Figs. 2 and 4, which supplement the ports I J and I' J' in allowing the water from the interior of the piston to pass to the recesses $i\ i$ behind it, to start the piston in its rotary movement.

I claim as my invention—

1. The combination of the casing and pivoted hub E of a water-meter, and a slotted piston having a partial rotation with the said hub, and adapted to slide thereon, with ports opening into the slot of the piston to allow the water to give the same a positive diametrical movement alternating with the said partial rotation of the piston, substantially as set forth.

2. The combination of the casing and hub E of a water-meter, and a slotted piston, G, having partial rotary motion with the hub, alternating with a diametrical sliding motion on the same, with ports H H and H' H' in the casing and ports K in the piston, substantially as specified.

3. The combination of the casing of a water-meter having inlet and outlet ports H H and H' H', with a hub, E, and a slotted piston, G, having ports I J and I' J', as and for the purpose described.

4. The combination of the casing having inlet and outlet ports and ports $l\ m$, with a hub, E, and slotted piston G, substantially as set forth.

FRANK WALKER.

Witnesses:
H. B. APPLEWHAITE,
T. WALTER FOWLER.